Jan. 7, 1969 D. A. FARRANT 3,420,129

SELF-INDEXING INTERMITTENT DRIVE MEANS

Filed Feb. 10, 1966

INVENTOR.
DAVID ARTHUR FARRANT
BY Lyon & Lyon
ATTORNEYS

United States Patent Office 3,420,129
Patented Jan. 7, 1969

3,420,129

SELF-INDEXING INTERMITTENT DRIVE MEANS

David A. Farrant, Northridge, Calif., assignor to Scionics Corporation, a corporation of California Filed Feb. 10, 1966, Ser. No. 526,456
U.S. Cl. 83—205 9 Claims
Int. Cl. B26d 5/22

ABSTRACT OF THE DISCLOSURE

In a system for cuttng a film chip from a strip and mounting such chip in a card, a specially constructed motor-driven disc has a resilient integrally formed section on which section gear teeth are formed for resilient and releasable connection to a pinion. The pinion is operatively connected to a shaft which drives a film-feeding mechanism, such shaft also being positionable by a manually operable knob when, in the at-rest position of the special disc the pinion is out of engagement with the disc teeth. Means are provided for assuring only one revolution of the disc for each film-cutting and applying operation. Also operatively connected to the disc is a shaft which is function being accomplished by an intermittent drive, such shaft being coupled to and serving to drive the film-cutting and applying mechanism.

The present invention relates to mechanisms which are cyclically operated and which are useful in performing a work function and an indexing function, the indexing function being accomplished by an intermittent drive, such in its at-rest condition being capable of being manually adjusted.

The present invention, while having general utility, is particularly useful in film mounters of the character described and claimed in the copending patent application of Francis A. Dedona et al., Serial No. 271,401, filed April 8, 1963 and now U.S. Patent 3,310,540 patented March 21, 1967, assigned also to the present assignee. In such film mounter, a frame of photographic film is cut from a supply reel and applied to an adhesive carried within an apertured portion of a card. The film mounter thus functions generally to cut and apply film to a card with the film reel being intermittently driven to feed the film to a cutting station where such film is cut and applied to the card. The apparatus described herein is for the purposes stated above and involves a specially constructed motor-driven disc having a resilient integrally formed section on which section gear teeth are formed for resilient and releasable connection to a pinion. The pinion is operatively connected to a shaft which drives a film-feeding mechanism, such shaft also being positionable by a manually operable knob when, in the at-rest position of the special disc, the pinion is out of engagement with the disc teeth. Means are provided for assuring only one revolution of the disc for each film-cutting and applying operation and such means involves a notched portion of the disc for operating a microswitch that serves to de-energize the motor driving the disc at that time when a portion of the microswitch enters such notched disc portion. Also operatively connected to the disc is a shaft which is reciprocated during such one revolution of the disc, such shaft being coupled to and serving to drive the film-cutting and applying mechanism.

An important feature of the arrangement described and claimed herein is in its ability for consistent reengagement and full cycle operations of the intermittent drive members on a next subsequent automatic machine cycle after a preceding manual adjustment of the driven gear to a random rest position that is not necessarily in proper mesh relation for reengagement.

It is therefore a general object of the present invention to provide an improved mechanism of the character indicated above.

A specific object of the present invention is to provide a mechanism of this character whcih is simple, rugged and compact and precise in its operation.

Another specific object of the present invention is to provide an improved mechanism of this character in which a motor-operated element serves to position a member such as, for example, a film strip with such member then thereafter being capable of being adjusted in position more accurately by a knob that may be turned independently of that element which initially positioned the member.

Another specific object of the present invention is to provide an improved self-indexing intermittent drive.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates structural details of a mechanism embodying features of the present invention with a portion of the system in which such mechanism is incorporated being illustrated in schematic form;

FIGURES 2 and 3 are sectional views taken generally as indicated by the corresponding lines 2—2 and 3—3 in FIGURE 1;

FIGURES 4 and 5 are sectional views taken along corresponding lines 4—4 and 5—5 in FIGURE 2;

Figures 1, 2, 3, 4, 5, 6, 7, 8:
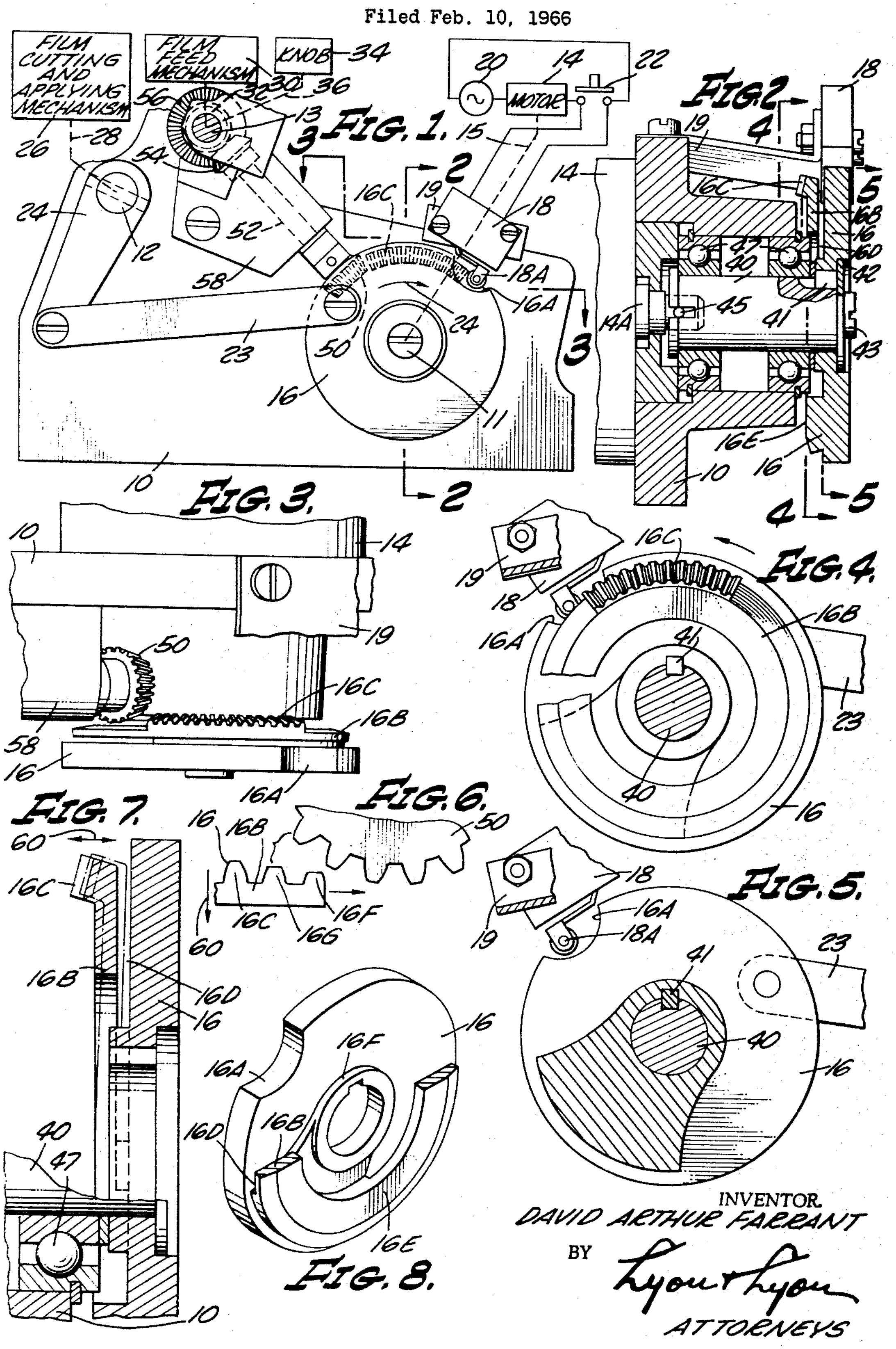
FIGURE 6 illustrates, in somewhat enlarged form, the relationship of the teeth on the pinion and the disc prior to their engagement during movement of the disc, from its at-rest condition illustrated in the previous figures.
FIGURE 7 is a view like FIGURE 2 but in enlarged form and illustrates also the resilient nature of that segment of the disc on which teeth are formed.
FIGURE 8 is a perspective view of the disc shown in the previous figures but with that cantilever supported portion on which teeth are formed, removed.

Referring to FIGURE 1, the mechanism involves a stationary supporting structure 10 on which three shafts 11, 12 and 13 are suitably mounted for rotation thereon. The shaft 11 is driven by an electric motor 14 as indicated by the dotted line 15 and such shaft 11 mounts a specially formed ring or disc 16 having a notched portion 16A (FIGURES 1 and 8) at its periphery for cooperation with the actuating element 18A of a functional microswitch 18, such switch 18 being mounted on a bracket 19 attached to and extending from the stationary supporting structure 10 as illustrated in FIGURE 2. This microswitch 18 is illustrated for the purposes of simplicity as being connected in a series circuit with the motor 14 and an AC energizing source 20, such switch 18 being connected in parallel with a normally open momentary type switch 22.

In the at-rest condition of the disc 16 illustrated in FIGURE 1, the switch actuating element 18A extends within the disc notched portion 16A to thereby allow the switch 18 to open, in which case, as illustrated in FIGURE 1, no energizing current flows through the motor 14. When the manually operable switch 22 is held in its closed position, an energizing current flows through the motor 14 and the disc 16 is rotated in the clockwise direction as indicated by the arrow 24 at which time the switch 18 automatically closes and then the switch 22 need no longer be maintained in a closed condition. With the switch 22 then open, the disc 16 rotates until the switch actuating member 18A enters the notched portion 16A, and at that time, the disc 16 is again in its at-rest condition. Since the disc 16 rotates once per actuation of switch 22, the disc 16 is referred to as a one-revolution disc.

Pin-connected to disc 16 is one end of an actuating rod 23 that has its other end pin-connected to a crank member 24, such crank member 24 being secured to the shaft 12 to produce an oscillation of the shaft 12 during one revolution of the disc 16. This shaft 12 drives the film-cutting and applying mechanism 26 as indicated by the dotted line 28.

The other shaft 13 operated during the latter stage of rotation of disc 16, is normally out of engagement with the disc 16 so that such shaft 13 to which the film-feeding mechanism 30 is attached, as indicated by the dotted line 32, may be manually adjusted by the knob 34, such knob 34 being connected to the shaft 13 as indicated by the dotted line 36. Thus, as illustrated in FIGURE 1, in the at-rest condition of the disc 16 the film-feeding mechanism 30 may be adjusted by knob 34 independently of any movement of disc 16 and such adjustment serves to provide, for example, in a film mounter of the character described in the above-mentioned patent application, a so-called fine adjustment during which the frame of a photographic film is accurately and manually positioned in the mounter by operation of knob 34. This so-called fine adjustment may or may not be necessary after the film has been automatically advanced in a manner described later during the one revolution of disc 16.

As seen in FIGURE 2, the disc 16 is mounted on one end of a shaft 40 using a key 41, washer 42 and screw 43, the other end of shaft 40 being secured to the shaft 14A of motor 14 using a pin 45 that passes through aligned apertured portions of the shafts 14A, 40. The shaft 40 is journalled for rotation in the stationary support structure 10 in conventional manner using a pair of spaced ball-bearing structures 47.

As seen in FIGURES 2 and 7, the disc 16 is integrally formed with a cantilever supported section 16B on the extreme end of which is formed circumferentially spaced gear teeth 16C. This cantilever supported section 16B may be formed by a milling operation wherein a groove 16D of approximately 1/16 inch thickness is cut in a direction extending perpendicular to the axis of disc 16, such groove 16D being also shown in particular in FIGURE 8 as well as a portion of the cantilever supported element 16B. The resulting thickness of this portion 16B is quite resiliently supported as indicated by the dotted lines in FIGURE 7 which illustrate the fact that the gear teeth 16C are resiliently mounted and may be displaced depending upon operating conditions in a direction that extends parallel with the rotational axis of the disc 16. Such resiliency assures proper engagement of the teeth 16C with the teeth of a pinion 50. This pinion 50 is mounted on one end of a shaft 52, the other end of the shaft 52 carrying a pinion 54 which is in constant mesh with a pinion 56 on shaft 13. The shaft 52 is suitably mounted for rotation and, as illustrated, is rotatably mounted in a bearing block 58 secured to the stationary support structure 10.

In forming the resilient disc portion 16B the disc 16 may initially be formed with a raised ring-shaped portion 16E which is then partially severed from the main disc portion 16, by a milling operation that results in cutting of the groove 16D.

It will be seen that in clockwise movement of the disc 16 in FIGURE 1, the shaft 12 for cutting and applying film is oscillated, there being a direct connection between the disc 16 and the shaft 12. On the other hand, the pinion 50 is engaged by the disc teeth portion 16C only during the last portion of revolution of the disc 16. The condition immediately prior to engagement is illustrated in FIGURE 6 wherein it is noted that the first two teeth 16F and 16G are made progressively larger but still smaller than the other succeeding gear teeth 16C to facilitate engagement of the disc 16 with the pinion 50.

Proper engagement is also assured by the fact that the disc portion 16B is resilient and is capable of movement as indicated by the arrows 60 in FIGURES 7 and 8. After engagement the pinion 50, of course, is rotated to advance the shaft 13 and advance a frame of photographic film by the film feed mechanism 30; and after the film is thus advanced, there is a disengagement of the pinion 50 from the disc 16 and the disc 16 thereafter is automatically brought to rest at which time the position of the film may be "fine adjusted" by manual operation of knob 34.

Thus, the apparatus has the desired ability of realizing consistent reengagement of the elements 16C, 50 and full cycle operations of the intermittently driven film feed mechanism 30 during each automatic machine cycle initiated by closing of switch 22 after a preceding manual adjustment of the knob 34 and pinion 50 during a time when, as shown in FIGURES 1 and 3, the pinion 50 is out of engagement with gear segment 16C and indeed, even though the pinion 50 may have been so adjusted that its teeth are not necessarily aligned in proper mesh relation for meshing reengagement of elements 16C, 50. In other words, should the previous adjustment of knob 34 have resulted in improper orientation of the teeth on pinion 50 with respect to the teeth on gear segment 16C, then because of the new structural arrangement incorporated herein the resiliently mounted cantilever supported gear segment 16C adjusts itself during initial engagement with gear 50 to achieve the meshing between 50, 16C which would not otherwise result.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. In an arrangement of the character described, a member; means for producing rotation of said member; a mechanism intermittently driven by said member upon its rotation; means releasably coupling said member to said mechanism; said coupling means including first gear means for driving said mechanism and second gear means mounted on said member and engaging said first gear means during only a fractional part of one revolution of said member; and means resiliently pressing said first and second gear means into engagement, said first gear means including a continuous gear, said second gear means including a discontinuous gear on said member, said discontinuous gear being integrally formed on and near the end of a cantilever portion of said member with said cantilever portion serving as said pressing means.

2. In an arrangement of the character described, a member; means for producing rotation of said member; a mechanism intermittently driven by said member upon its rotation; means releasably coupling said member to said mechanism; said coupling means including first gear means for driving said mechanism and second gear means mounted on said member and engaging said first gear means during only a fractional part of one revolution of said member; and means resiliently pressing said first and second gear means into engagement, said pressing means permitting the engagement of said second gear means with said first gear means randomly and without regard to the at-rest relationship of the teeth of said first gear means to the teeth of said second gear means.

3. In an arrangement of the character described, a member; means for producing rotation of said member; a mechanism intermittently driven by said member upon its rotation; means releasably coupling said member to said mechanism; said coupling means including first gear means for driving said mechanism and second gear means mounted on said member and engaging said first gear means during only a fractional part of one revolution of said member; and means resiliently pressing said first and second gear means into engagement, said intermittently driven mechanism being randomly repositioned during a revolution of said member and during a time interval when said first and second gear means are out of engagement without the requirement of a subsequent reindexing of the second gear means with respect to the first gear means prior to reengagement of said first and second gear means.

4. An arrangement as set forth in claim 1 in which said discontinuous gear rotates in a plane which is substantially perpendicular to the axis of rotation of said member.

5. An arrangement as set forth in claim 4 in which said member is formed with a peripheral portion, and means actuated by said peripheral portion and controlling said rotation producing means.

6. An arrangement as set forth in claim 5 in which said mechanism is a film feed mechanism, and means operated upon rotation of said member for cutting film fed by said mechanism.

7. In an arrangement of the character described, a member; means for producing rotation of said member; a mechanism intermittently driven by said member upon its rotation; means releasably coupling said member to said mechanism; said coupling means including first gear means for driving said mechanism and second gear means mounted on said member and engaging said first gear means during only a fractional part of one revolution of said member; and means resiliently pressing said first and second gear means into engagement, said member being in the form of a disc which has a radially extending slit therein that separates the body of the disc from a cantilever portion thereof, the thickness of said cantilever portion being sufficiently small to provide resiliency in said cantilever portion and provide said pressing means; said disc being rotatable about its axis; said second gear means being on the end of said cantilever portion and extending circumferentially and in a plane which is substantially perpendicular to said axis.

8. An arrangement as set forth in claim 7 in which said disc has a peripheral notched portion for controlling said rotation producing means.

9. An arrangement as set forth in claim 8 in which said mechanism is a film feeding mechanism; a film cutting mechanism for cutting film fed by said feeding mechanism; a crank arm having one of its ends pivotally mounted on said disc and the other one of its ends driving said cutting mechanism; said first gear means including a bevel gear meshable with said second gear means; and several of those first teeth of said second gear means that initially engage the teeth of said bevel gear being tapered to facilitate initial engagement between teeth of said first and second gear means.

References Cited

UNITED STATES PATENTS

| | | | |
|---|---|---|---|
| 271,835 | 2/1883 | Gilbert | 83—275 X |
| 308,119 | 11/1884 | White | 83—275 X |
| 1,062,932 | 5/1913 | Schneider | 83—275 X |
| 1,128,721 | 2/1915 | Ray et al. | 83—205 |
| 1,693,361 | 11/1928 | Beaney | 83—275 |
| 2,188,994 | 2/1940 | Anderson et al. | 83—275 X |
| 2,219,650 | 10/1940 | Helsel | 83—203 |
| 3,088,357 | 5/1963 | Styner | 83—249 X |
| 3,172,322 | 3/1965 | Hirschey | 83—205 |

ANDREW R. JUHASZ, *Primary Examiner.*

FRANK T. YOST, *Assistant Examiner.*

U.S. Cl. X.R.

83—249, 275